(12) United States Patent
Aoki et al.

(10) Patent No.: US 10,814,702 B2
(45) Date of Patent: Oct. 27, 2020

(54) OPENING/CLOSING DRIVE DEVICE

(71) Applicant: DENSO CORPORATION, Kariya-shi, Aichi-ken (JP)

(72) Inventors: Yoshio Aoki, Kariya (JP); Tetsuya Honda, Kariya (JP)

(73) Assignee: DENSO CORPORATION, Kariya-shi, Aichi-ken (JP)

( * ) Notice: Subject to any disclaimer, the term of this patent is extended or adjusted under 35 U.S.C. 154(b) by 140 days.

(21) Appl. No.: 16/073,753

(22) PCT Filed: Feb. 2, 2017

(86) PCT No.: PCT/JP2017/003735
§ 371 (c)(1),
(2) Date: Jul. 27, 2018

(87) PCT Pub. No.: WO2017/135360
PCT Pub. Date: Aug. 10, 2017

(65) Prior Publication Data
US 2019/0016197 A1    Jan. 17, 2019

(30) Foreign Application Priority Data
Feb. 5, 2016    (JP) .................. 2016-020850

(51) Int. Cl.
*E05F 15/02* (2006.01)
*B60J 1/17* (2006.01)
(Continued)

(52) U.S. Cl.
CPC ............... *B60J 1/17* (2013.01); *E05F 15/689* (2015.01); *E05F 15/695* (2015.01); *E05F 15/41* (2015.01);
(Continued)

(58) Field of Classification Search
CPC ......... B60J 1/17; E05F 15/689; E05F 15/695; E05F 16/41; E05Y 2400/50; E05Y 2400/54; E05Y 2900/55; H02H 7/0851
(Continued)

(56) References Cited

U.S. PATENT DOCUMENTS 5,459,379 A    10/1995  Takeda et al.
8,590,210 B2 * 11/2013  Schindhelm ............ E05F 15/70
                                                    296/146.2
(Continued)

FOREIGN PATENT DOCUMENTS

DE              4326216 A1        4/1996
DE        112017000662 T5 * 10/2018 ............ E05F 15/689
(Continued)

OTHER PUBLICATIONS

International Search Report for PCT/JP2017/003735 dated Mar. 21, 2017, all pages.
(Continued)

*Primary Examiner* — Jerry E Redman
(74) *Attorney, Agent, or Firm* — Kilpatrick Townsend & Stockton LLP (57) ABSTRACT

An opening/closing drive device drives an upwardly and downwardly movable opening/closing member. The opening/closing drive device includes a motor, a position detection sensor configured to detect a position of the opening/closing member, and a controller. The controller is configured to drive the motor in order to upwardly move the opening/closing member when determining in a state in which the motor is not driven that the opening/closing member has moved downward to a position corresponding to a predetermined threshold or lower based on a signal from the position detection sensor.

15 Claims, 3 Drawing Sheets

(51) Int. Cl.
*E05F 15/689* (2015.01)
*E05F 15/695* (2015.01)
*E05F 15/41* (2015.01)
*H02H 7/085* (2006.01)

(52) U.S. Cl.
CPC ....... *E05Y 2400/50* (2013.01); *E05Y 2400/54* (2013.01); *E05Y 2900/55* (2013.01); *H02H 7/0851* (2013.01)

(58) Field of Classification Search
USPC ................................................. 49/26, 27, 28
See application file for complete search history.

(56) References Cited

U.S. PATENT DOCUMENTS

| | | | | |
|---|---|---|---|---|
| 8,991,103 | B2* | 3/2015 | Schlesiger | H02H 7/0851 |
| | | | | 49/28 |
| 9,239,579 | B2* | 1/2016 | Schlesiger | G05B 24/02 |
| 9,617,777 | B2* | 4/2017 | Aoshima | E05F 15/41 |
| 2001/0030520 | A1* | 10/2001 | Losey | G01M 3/12 |
| | | | | 318/445 |
| 2006/0208678 | A1* | 9/2006 | Choby | E05F 15/41 |
| | | | | 318/280 |
| 2009/0295556 | A1* | 12/2009 | Inoue | E05F 15/46 |
| | | | | 340/438 |
| 2012/0005963 | A1* | 1/2012 | Zellmer | G05B 13/024 |
| | | | | 49/358 |
| 2016/0222712 | A1* | 8/2016 | Nishio | B60J 1/08 |
| 2018/0148968 | A1* | 5/2018 | Shitara | E05F 15/46 |
| 2018/0230731 | A1* | 8/2018 | Nagao | B60J 1/00 |
| 2018/0238095 | A1* | 8/2018 | Nagao | E05F 15/443 |
| 2019/0003238 | A1* | 1/2019 | Sugiyama | E05F 15/697 |
| 2019/0265074 | A1* | 8/2019 | Gaydov | G01D 21/00 |
| 2019/0337366 | A1* | 11/2019 | Kawaguchi | B60J 7/057 |
| 2020/0031207 | A1* | 1/2020 | Henes | B60J 1/17 |

FOREIGN PATENT DOCUMENTS

| | | |
|---|---|---|
| EP | 1645710 A | 4/2006 |
| GB | 2271863 A | 4/1994 |
| JP | 06-137030 A | 5/1994 |
| JP | 06-146718 A | 5/1994 |
| JP | H06137030 A | 5/1994 |
| JP | H06146718 A | 5/1994 |
| JP | 08-156583 A | 6/1996 |
| JP | 200957038 A | 3/2009 |
| JP | 2014171377 A | 9/2014 |
| WO | 2017135360 A1 | 8/2017 |

OTHER PUBLICATIONS

International Preliminary Report on Patentability for PCT/JP2017/003735 dated Aug. 7, 2018, all pages.

* cited by examiner

001
OPENING/CLOSING DRIVE DEVICE

TECHNICAL FIELD

The present invention relates to an opening/closing drive device.

BACKGROUND ART

An opening/closing drive device used in a vehicle power window device or the like includes a motor having a fall prevention mechanism that prevents falling (downward movement) of a window glass (refer to, for example, patent document 1).

When the window glass appears to fall, the fall prevention mechanism of the motor uses friction resistance produced when a braking member arranged at a side of a housing presses and contacts one axial end of a rotation shaft.

PRIOR ART DOCUMENT

Patent Document

Patent Document 1: Japanese Laid-Open Patent Publication No. 2014-171377

SUMMARY OF THE INVENTION

Problems that are to be Solved by the Invention

However, in the above opening/closing drive device, the friction resistance needs to be increased so that, for example, vibration or the like does not downwardly move an opening/closing member. The increase in the friction resistance will adversely affect activation characteristics of the motor. This increases the torque generated during activation and consequently enlarges the motor.

It is an object of the present invention to provide an opening/closing drive device that improves the activation characteristics of a motor while preventing an opening/closing member from remaining downwardly moved.

Means for Solving the Problem

In order to achieve the above object, an opening/closing drive device according to a first aspect of the present disclosure drives an upwardly and downwardly movable opening/closing member. The opening/closing drive device includes a motor, a position detection sensor configured to detect a position of the opening/closing member, and a controller configured to drive the motor in order to upwardly move the opening/closing member when determining in a state in which the motor is not driven that the opening/closing member has moved downward to a position corresponding to a predetermined threshold or lower based on a signal from the position detection sensor.

An opening/closing drive device according to a second aspect of the present disclosure drives an upwardly and downwardly movable opening/closing member. The opening/closing drive device includes a motor, a position detection sensor configured to detect a position of the opening/closing member, and a controller configured to drive the motor in order to upwardly move the opening/closing member when determining in a state in which the motor is not driven that the opening/closing member has moved downward to a position distanced by a predetermined threshold or greater based on a signal from the position detection sensor.

An opening/closing drive device according to a third aspect of the present disclosure drives an upwardly and downwardly movable opening/closing member. The opening/closing drive device includes a motor, a position detection sensor configured to detect a position of the opening/closing member, and a controller that controls driving of the motor. The controller is configured to determine a downward movement amount of the opening/closing member based on a signal from the position detection sensor or determine a position of the opening/closing member after being downwardly moved based on a signal from the position detection sensor. The controller is configured to drive the motor in order to upwardly move the opening/closing member in a state in which the motor is not driven when the downward movement amount is beyond a predetermined threshold value or when the position of the opening/closing member after being downwardly moved is beyond a certain position.

EMBODIMENTS OF THE INVENTION

One embodiment of a power window device will now be described with reference to FIGS. 1 to 5.

Figure 1:
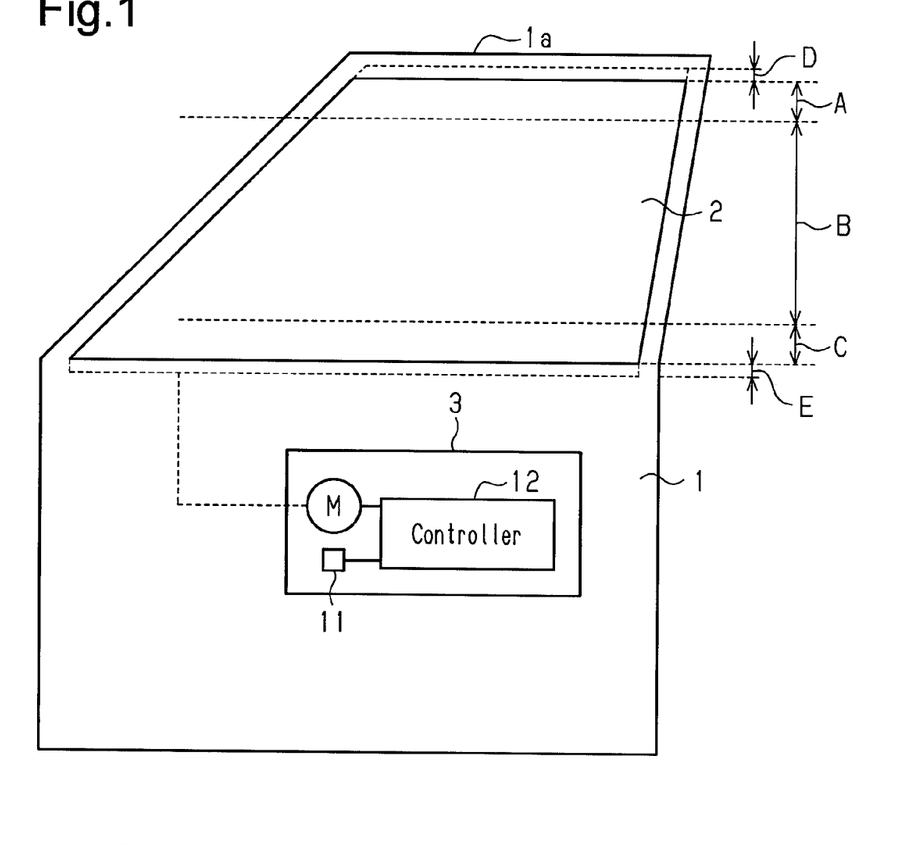
FIG. 1 is a schematic diagram showing a power window device of the present invention.

As shown in FIG. 1, a vehicle door 1 includes a window glass 2 serving as an opening/closing member. The window glass 2 is movable upward and downward. A motor M of an opening/closing drive device 3 is coupled to the window glass 2 by a regulator (not shown) or the like.

Figure 2:
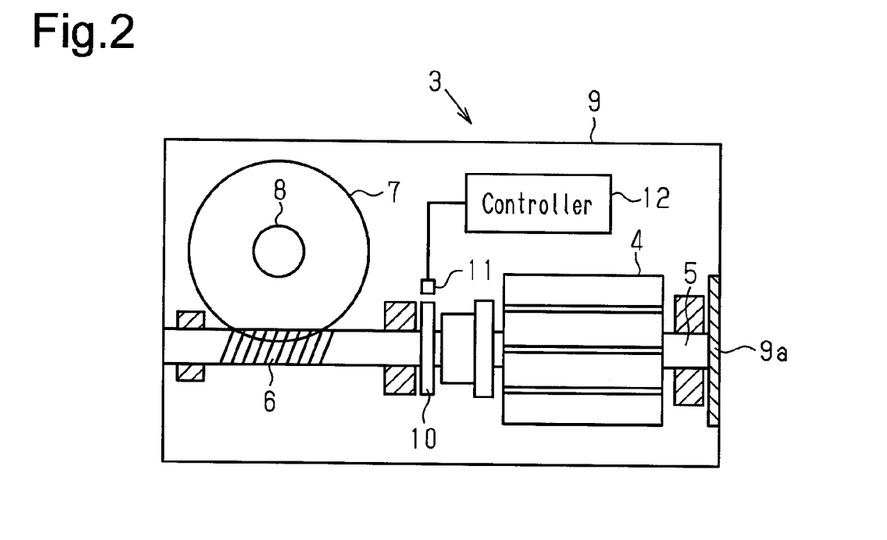
FIG. 2 is a schematic diagram showing an opening/closing drive device according to one embodiment of the present invention.

As shown in FIG. 2, the motor M includes a rotation shaft 5 to which an armature 4 is fixed, a worm 6 that rotates integrally with the rotation shaft 5, and a worm wheel 7 meshed with the worm 6. The window glass 2 is coupled to an output shaft 8, which rotates integrally with the worm wheel 7, by the regulator or the like. Further, a housing 9 that accommodates the motor M includes a braking member 9a located at a position opposing one axial end of the rotation shaft 5. The axial end of the rotation shaft 5 contacts the braking member 9a when the window glass 2 appears to fall (move downward).

Further, the opening/closing drive device 3 includes a Hall IC 11 located in the housing 9 and in the proximity of a sensor magnet 10, which is fixed to the rotation shaft 5. The Hall IC 11 serves as a position detection sensor that can detect the position of the window glass 2. In addition, the housing 9 of the opening/closing drive device 3 includes a controller 12 formed by, for example, an IC chip. For example, circuitry may be implemented as the controller 12. More specifically, one or more dedicated hardware circuits such as an ASIC, one or more processing circuits running on computer programs (software), or a combination of a hardware circuit and a processing circuit may be implemented as the controller 12. The processing circuit includes a CPU and a memory (for example, ROM or RAM) that store programs executed by the CPU. The memory, or computer readable medium, includes any type of medium that is accessible by a versatile computer or a dedicated computer.

The Hall IC 11 outputs, to the controller 12, a pulse signal in accordance with changes in flux of the sensor magnet 10 when the rotation shaft 5 rotates. The pulse signal produces a single pulse, for example, whenever the window glass 2 is moved upward or downward by 2 mm.

When an operation switch (not shown) arranged on the vehicle door 1 is operated, the controller 12 drives the motor M to upwardly or downwardly move the window glass 2 in accordance with the operation.

Further, if the window glass 2 moves downward in a state in which the motor M is not driven and the controller 12 determines that the window glass 2 has moved downward to a position distanced by a predetermined threshold value (downward movement amount) or greater based on a pulse signal from the Hall IC 11 obtained as the window glass 2 downwardly moves, the controller 12 drives the motor M to upwardly move the window glass 2.

More specifically, the controller 12 of the present embodiment sets the threshold value (downward movement amount) in accordance with the position where the window glass 2 was located when the motor M was stopped. In detail, the controller 12 sets the threshold value (downward movement amount) in accordance with the part of a window area (area including vehicle window and portions proximate to the upper and lower sides of vehicle window) where the window glass 2 is located. It is preferred that "the position of the window glass 2" be the position of an upper end of the window glass 2.

As shown in FIG. 1, if the position where the window glass 2 was located when the motor M was stopped is in a closure proximity area A, the threshold value is set to a small downward movement amount (first downward movement amount). If the position where the window glass 2 was located when the motor M was stopped is in an open/closed intermediate area B that is located downward from the closure proximity area A, the threshold value is set to a large downward movement amount (second downward movement amount). The closure proximity area A is set to, for example, an area extending from a position where the window glass 2 fully closes the window opening to a position located 5 cm downward from the fully-closed position. The small downward movement amount is set to, for example, 6 mm (corresponding to three pulses), and the large downward movement amount is set to, for example, 14 mm (corresponding to seven pulses).

Further, if the position where the window glass 2 was located when the motor M was stopped is in a fully-open proximity area C, the threshold value is set to the small downward movement amount (first downward movement amount). If the position where the window glass 2 was located when the motor M was stopped is in the open/closed intermediate area B that is located upward from the fully-open proximity area C, the threshold value is set to the large downward movement amount (second downward movement amount). The fully-open proximity area C is set to, for example, an area extending from a position where the window glass 2 fully opens the window opening to a position located 5 cm upward from the fully open position. The small downward movement amount is set to, for example, 6 mm (corresponding to three pulses), and the large downward movement amount is set to, for example, 14 mm (corresponding to three pulses).

Figure 3A:
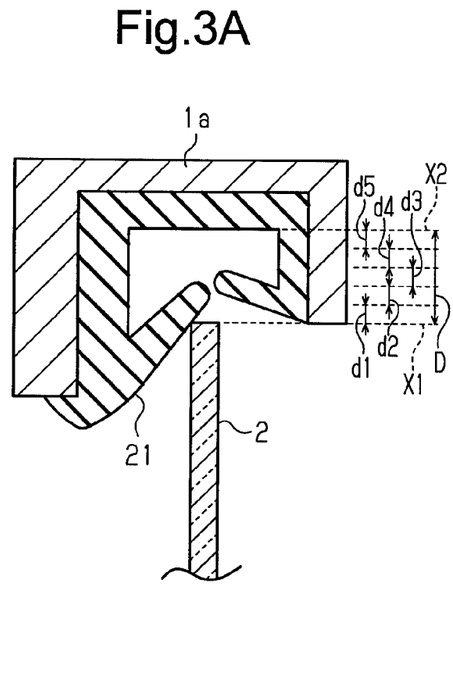
FIGS. 3A and 3B are schematic cross-sectional views illustrating a closure movable area in FIG. 1.
Figure 3B:
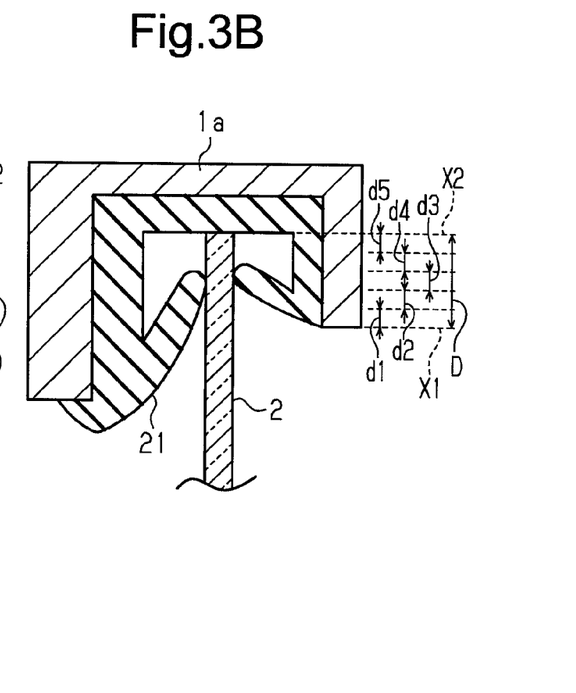

As shown in FIGS. 3A and 3B, an upper end door frame 1a includes a glass run 21 serving as an upper end frame member. The position where the upper end of the window glass 2 reaches the glass run 21 from below (refer to FIG. 3A) is defined as the close position X1. The position located upward from the close position X1 is defined as the upward movement limit position X2. The window glass 2 is in a fully-closed state at the close position X1 and is further upwardly movable to the upward movement limit position X2 (refer to FIG. 3B) while maintaining the fully-closed state. The glass run 21 is formed from an elastic member. The glass run 21 ensures the sealing between the inner side and the outer side of the vehicle in the fully-closed state and absorbs impact that is produced when the window glass 2 reaches the upward movement limit position X2.

If the position where the window glass 2 was located when the motor M was stopped is in a closure movable area D that is set between the close position X1 and the upward movement limit position X2, the threshold value is set to a downward movement amount that corresponds to a position that is higher than or equal to the close position X1. That is, when the upper end of the window glass 2 is located in the closure movable area D, the threshold value is set to a downward movement amount that is greater than zero and less than or equal to the distance between the position where the window glass 2 was located when the motor M was stopped and the close position X1. In the present embodiment, the threshold value is set separately for multiple stages in the closure movable area D and is set to a larger downward movement amount as the position where the window glass 2 was located when the motor M was stopped becomes closer to the upward movement limit position X2. More specifically, the threshold value of the present embodiment is set separately for five stages divided between the close position X1 and the upward movement limit position X2 (refer to broken lines in FIG. 3) in accordance with the number of rising edges of the pulse signal output from the Hall IC 11. The threshold value is set separately for first to fifth areas d1 to d5 that are divided in order from lower positions where the window glass 2 was located when the motor M was stopped. If the position where the window glass 2 was located when the motor M was stopped is in a fifth area d5 that is immediately below the upward movement limit position X2, a downward movement amount corresponding to five pulses (five pulse signal rising edges) is set as the threshold value. In the following description, a downward movement corresponding to four pulses is set for a fourth area d4, a downward movement corresponding to three pulses is set for a third area d3, a downward movement corresponding to two pulses is set for a second area d2, and a downward movement corresponding to one pulse is set for a first area d1.

More specifically, for example, if the position where the window glass 2 was located when the motor M was stopped is in the fifth area d5 of the closure movable area D and the controller 12 determines in a state in which the motor M is not driven that the window glass 2 has downwardly moved over an amount corresponding to five pulses (five pulse signal rising edges), the controller 12 drives the motor M to upwardly move the window glass 2. Further, for example, if the position where the window glass 2 was located when the motor M was stopped is in the third area d3 of the closure movable area D and the controller 12 determines in a state in which the motor M is not driven that the window glass 2 has downwardly moved over an amount corresponding to three pulses (three pulse signal rising edges), the controller 12 drives the motor M to upwardly move the window glass 2. Further, for example, if the position where the window glass 2 was located when the motor M was stopped is in the first area d1 of the closure movable area D and the controller 12 determines in a state in which the motor M is not driven that the window glass 2 has downwardly moved over an amount corresponding to one pulse (one pulse signal rising edge), the controller 12 drives the motor M to upwardly move the window glass 2.

Figure 4:
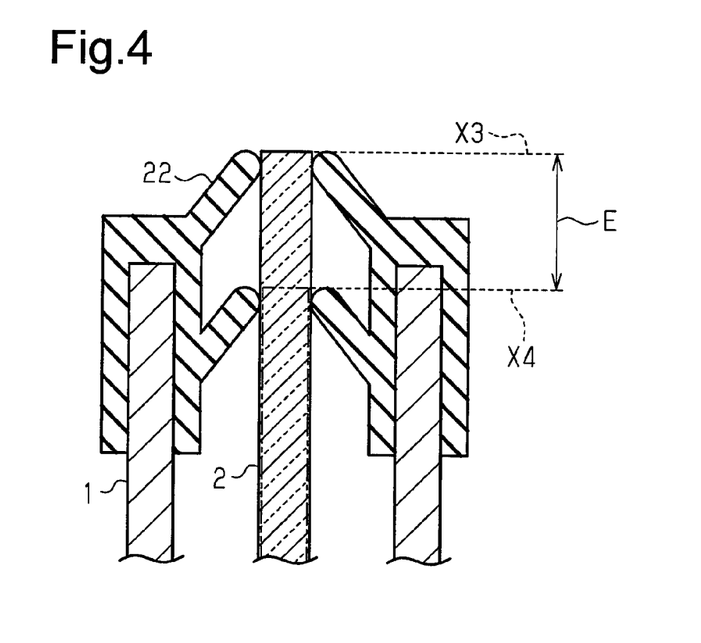
FIG. 4 is a schematic cross-sectional view illustrating a fully-open movable area in FIG. 1.

Further, as shown in FIG. 4, the vehicle door 1 includes a belt molding 22 serving as a lower end frame member. The position where the upper end of the window glass 2 reaches the belt molding 22 from above is defined as the fully-open position X3. The window glass 2 is in a fully-open state at the fully-open position X3 and is further downwardly movable to a downward movement limit position X4 while maintaining the fully-open state. The belt molding 22 is formed from an elastic member. The belt molding 22 slides in contact with the window glass 2 to limit the entrance of rainwater or the like into the vehicle door 1.

If the position where the window glass 2 was located when the motor M was stopped is in a fully-open movable area E that is set between the fully-open position X3 and the downward movement limit position X4, the threshold value is not set. Here, "the threshold value is not set" means that the motor M is not driven (window glass 2 is not upwardly moved) regardless of the amount the position of the window glass 2 moves downward in a state in which the motor M is not driven. Additionally, for example, the area where the threshold value is not set may be an area that is larger than the fully-open movable area E.

Further, in a state in which the motor M is not driven, when the controller 12 of the present embodiment determines that the window glass 2 has moved downward to a position over the threshold value (downward movement amount) or greater, the controller 12 drives the motor M to upwardly move the window glass 2 to the position where the window glass 2 was located when the motor M was stopped.

The operation of the controller 12 of the present embodiment will now be described in detail.

Figure 5:
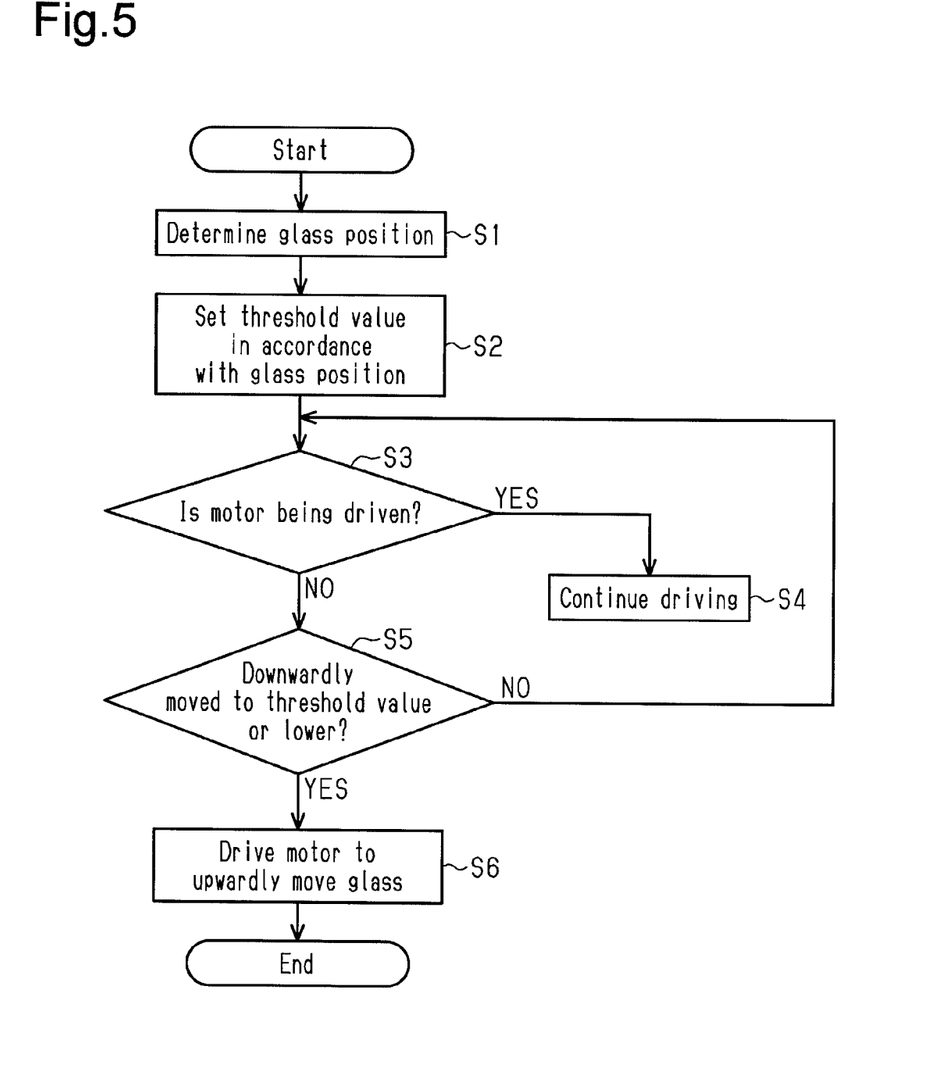
FIG. 5 is a flowchart illustrating the processing executed by a controller of FIG. 2.

As shown in FIG. 5, the controller 12 executes the following processing based on a pulse signal that is output from the Hall IC 11 when, for example, vibration produced during traveling moves the window glass 2 downward.

In step S1, the controller 12 determines the position of the window glass 2 when the motor M has been stopped (by controller 12) from a pulse signal that has been input. Then, the controller 12 proceeds to step S2.

In step S2, the controller 12 sets the threshold value in accordance with the position (area) of the window glass 2 when the motor M was stopped by the controller 12. Then, the controller 12 proceeds to step S3. For example, if the position where the window glass 2 was located when the motor M was stopped is in the closure proximity area A, the threshold value is set to a small downward movement amount (for example, 6 mm corresponding to three pulses).

In step S3, the controller 12 determines whether or not the motor M is being driven (window glass 2 is downwardly moving). When the controller 12 determines that the motor M is being driven, the controller 12 proceeds to step S4 and continues to drive the motor M. When the controller 12 determines that the motor M is not being driven, the controller 12 proceeds to step S5. That is, in step S3, the controller 12 determines whether or not the window glass 2 is falling because of vibration or the like produced during traveling.

In step S5, the controller 12 determines whether or not the window glass 2 has moved downward to a position distanced by the set threshold value or greater. When the controller 12 determines that the window glass 2 has not moved downward to a position distanced by the threshold value or greater, the controller 12 repeats steps S3 and S5. When the controller 12 determines that the window glass 2 has moved downward to a position distanced by the threshold value or greater, the controller 12 proceeds to step S6.

In step S6, the controller 12 drives the motor M to upwardly move the window glass 2 to the position where the window glass 2 was located when the motor M was stopped by the controller 12. Then, the controller 12 ends the process. This returns the window glass 2 to the position where the window glass 2 was located when the motor M was stopped (position before window glass 2 was downwardly moved by vibration or the like) and prevents the window glass 2 from remaining downwardly moved.

The above embodiment has the advantages described below.

(1) The controller 12 is configured to drive the motor M in order to upwardly move the window glass 2 when determining in a state in which the motor M is not driven that the window glass 2 has moved downward to a predetermined threshold value or lower based on a pulse signal from the Hall IC 11. In other words, the controller 12 is configured to drive the motor M in order to upwardly move the window glass 2 when determining in a state in which the motor M is not driven that the window glass 2 has moved downward to a position distanced by the predetermined threshold value or greater based on a pulse signal from the Hall IC 11. Thus, the position of the window glass 2 can be returned to an upper position even if, for example, the window glass 2 is downwardly moved by vibration or the like. This, for example, allows the friction resistance of the motor M that restricts downward movement of the window glass 2 (i.e., friction resistance between one axial end of rotation shaft 5 and braking member 9a) to be reduced and the activating characteristics of the motor M to be improved in a preferred manner. As a result, for example, the torque for activating the motor M can be reduced. Consequently, the motor M can be reduced in size.

(2) The controller 12 sets a threshold value in accordance with the position where the window glass 2 was located when the motor M was stopped. This allows, for example, the window glass 2 to be upwardly moved when necessary. For example, when the window glass 2 is located at a position where the user will not be annoyed if the window glass 2 moves slightly downward, upward movement of the window glass 2 is restricted when the window glass 2 moves slightly downward. This reduces power consumption.

(3) If the position where the window glass 2 was located when the motor M was stopped is in the closure proximity area A, the threshold value is set to a small downward movement amount. Thus, when the slightly open window opening is slightly enlarged, the window glass 2 is returned to the upper position, and, for example, the user will feel less annoyed. Further, if the position where the window glass 2 was located when the motor M was stopped is in the open/closed intermediate area B, which is located downward from the closure proximity area A, the threshold value is set to a large downward movement amount. Thus, when the window opening extending to the intermediate position is slightly enlarged, the motor M is not driven and power consumption is reduced. This allows for the reduction in power consumption without annoying the user.

(4) If the position where the window glass 2 was located when the motor M was stopped is in the fully-open proximity area C, the threshold value is set to a small downward movement amount. Thus, when the slightly closed window opening closed by the window glass 2 becomes slightly enlarged, the window glass 2 is returned to the upper position, and, for example, the user will feel less annoyed. Further, if the position where the window glass 2 was located when the motor M was stopped is in the open/closed intermediate area B, which is located upward from the fully-open proximity area C, the threshold value is set to a large downward movement amount. Thus, when the window opening extending to the intermediate position is slightly enlarged, the motor M is not driven and power consumption is reduced. This allows for the reduction in power consumption without annoying the user.

(5) If the position where the window glass 2 was located when the motor M was stopped is in the closure movable area D, which is set between the close position X1 and the upward movement limit position X2, the threshold value is set based on a position corresponding to the close position X1 or higher. Thus, when the window glass 2 is moved downward over a threshold value or lower that corresponds to the close position X1 or higher (close position X1 in the present embodiment), the window glass 2 is upwardly driven. In other words, when the upper end of the window glass 2 is located in the closure movable area D, the threshold value is set to a downward movement amount that is greater than zero and less than or equal to the distance between the position where the window glass 2 was located when the motor M was stopped and the close position X1. Thus, when the upper end of the window glass 2 is located in the closure movable area D in a state in which the motor M is stopped and the window glass 2 then moves downward to a position located downward from the close position X1 (when window glass 2 moves downward over a length greater than distance between position where window glass 2 was located when motor M was stopped and close position X1), the controller 12 drives the motor M to upwardly move the window glass 2. This prevents the window glass 2 from moving out of the closure movable area D and stopping at a position located downward from the close position X1. Thus, the formation of a slight gap from the closed state is hindered.

(6) If the position where the window glass 2 was located when the motor M was stopped is in the closure movable area D, the threshold value is set separately for multiple stages. As the position where the window glass 2 was located when the motor M was stopped becomes closer to the upward movement limit position X2, the threshold value is set to a larger downward movement amount. Thus, the window glass 2 is not driven more than necessary. That is, even when the window glass 2 moves slightly downward from, for example, a position located proximate to the upward movement limit position X2 (for example, by amount corresponding to two pulses from fourth area d4), the fully-closed state is maintained. In such a case, the motor M is not driven. This allows power consumption to be reduced.

(7) If the position where the window glass 2 was located when the motor M was stopped is in the fully-open movable area E, which is set between the fully-open position X3 and the downward movement limit position X4, the threshold value is not set. Thus, the window glass 2 is not driven upward. This allows power consumption to be reduced.

The above embodiment may be modified as described below.

In the above embodiment, the controller 12 sets a threshold value in accordance with the position (of the window glass 2) where the window glass 2 was located when the motor M was stopped. Instead, the controller 12 may set, for example, a threshold value that is always constant.

In the above embodiment, the threshold value is set to a small downward movement amount if the position where the window glass 2 was located when the motor M was stopped is in the closure proximity area A and the fully-open proximity area C, and the threshold value is set to a large downward movement amount when the position of the window glass 2 is in the open/closed intermediate area B. Instead, for example, when the position of the window glass 2 is in the fully-open proximity area C, the threshold value may be set to a downward movement amount that is larger than when the position of the window glass 2 is in the closure proximity area A in the same manner as when the position of the window glass 2 is in the open/closed intermediate area B.

In the above embodiment, if the position where the window glass 2 was located when the motor M was stopped is in the closure movable area D, which is set between the close position X1 and the upward movement limit position X2, the threshold value is set to a downward movement amount corresponding to the close position X1 or higher. Instead, the threshold value may be set to any downward movement amount when the position of the window glass 2 is in the closure movable area D.

In the above embodiment, the threshold value is set separately for multiple stages when the position where the window glass 2 was located when the motor M was stopped is in the closure movable area D, and the threshold value is set to a larger downward movement amount as the position where the window glass 2 was located when the motor M was stopped becomes closer to the upward movement limit position X2. Instead, control may be executed to upwardly move the window glass 2 under another condition in which the window glass 2 is moved downward to the close position X1 or lower. More specifically, for example, if the position where the window glass 2 was located when the motor M was stopped is in the closure movable area D and any one of a condition in which the window glass 2 is downwardly moved over an amount corresponding to three pulses and a condition in which the window glass 2 is moved downward to a position that is lower than or equal to the close position X1 is satisfied, the controller 12 may determine that the window glass 2 has moved downward to a position distanced by the threshold value or greater to upwardly move the window glass 2.

In the above embodiment, if the position where the window glass 2 was located when the motor M was stopped is in the fully-open movable area E, which is set between the fully-open position X3 and the downward movement limit position X4, the threshold value is not set. Instead, the threshold value may be set to any value.

In the above embodiment, when the controller 12 upwardly moves the window glass 2, the controller 12 upwardly moves the window glass 2 to the position where the window glass 2 was located when the motor M was stopped. Instead, as long as the window glass 2 is located proximate to the position where the window glass 2 was located when the motor M was stopped, the amount of the upward movement may be changed.

In the above embodiment, the Hall IC 11 is used. Instead, as long as (information corresponding to) the position of the window glass 2 is detectable, other position detection sensors may be used.

In the above embodiment, the opening/closing drive device 3 includes the motor M, the Hall IC 11, and the controller 12 that are accommodated in the same housing 9. Instead, the opening/closing drive device may be formed by a motor device that includes the motor M and the Hall IC 11 and the controller 12 that is separate from the motor device and connected to the motor device by a wire.

In the above embodiment, the present invention is applied to the power window device that upwardly and downwardly moves the window glass 2. Instead, the present invention may be applied to other opening/closing drive devices that upwardly and downwardly move an opening/closing member other than the window glass 2.

DESCRIPTION OF REFERENCE CHARACTERS

2) window glass (opening/closing member); 11) Hall IC (position detection sensor); 12) controller; 21) glass run (upper end frame member); 22) belt molding (lower end frame member); A) closure proximity area; B) open/closed intermediate area; C) fully-open proximity area; D) closure movable area; E) fully-open movable area; M) motor; X1) close position; X2) upward movement limit position; X3) fully-open position; X4) downward movement limit area

The invention claimed is:

1. An opening-closing drive device that drives an upwardly and downwardly movable opening-closing member, the opening-closing drive device comprising:
   a motor;
   a position detection sensor configured to detect a position of the opening-closing member when the motor is stopped and in a non-driven state and when the opening-closing member has inadvertently moved downward; and
   a controller configured to drive the motor in order to upwardly move the opening-closing member when determining that the opening-closing member has inadvertently moved downward to a position corresponding to a predetermined threshold or lower based on a signal from the position detection sensor when the motor is in the non-driven state and the opening-closing member has inadvertently moved downward by the predetermined threshold or lower amount.

2. The opening-closing drive device according to claim 1, wherein the controller is configured to set the threshold value in accordance with a position where the opening-closing member was located when the motor was stopped.

3. The opening-closing drive device according to claim 2, wherein
   the threshold value is set to a first downward movement amount if the position where the opening-closing member was located when the motor was stopped is in a closure proximity area, and
   the threshold value is set to a second downward movement amount that is greater than the first downward movement amount if the position where the opening-closing member was located when the motor was stopped is in an open-closed intermediate area that is located downward from the closure proximity area.

4. The opening-closing drive device according to claim 2, wherein
   the threshold value is set to a first downward movement amount if the position where the opening-closing member was located when the motor was stopped is in a fully-open proximity area, and
   the threshold value is set to a second downward movement amount that is greater than the first downward movement amount if the position where the opening-closing member was located when the motor was stopped is in an open-closed intermediate area that is located upward from the fully-open proximity area.

5. The opening-closing drive device according to claim 2, wherein
   a position where the opening-closing member reaches an upper end frame member from below is defined as a close position,
   a position located upward from the close position is defined as an upward movement limit position,
   the opening-closing member is in a fully-closed state at the close position and is further upwardly movable to the upward movement limit position while maintaining the fully-closed state,
   an area between the close position and the upward movement limit position is defined as a closure movable area, and
   the threshold value is set to a position that is higher than or equal to the close position if the position where the opening-closing member was located when the motor was stopped is in the closure movable area.

6. The opening-closing drive device according to claim 5, wherein
   the threshold value is set separately for multiple stages if the position where the opening-closing member was located when the motor was stopped is in the closure movable area, and
   as the position where the opening-closing member was located when the motor was stopped becomes closer to the upward movement limit position, the threshold value is set to a larger downward movement amount.

7. The opening-closing drive device according to claim 2, wherein
   a position where the opening-closing member reaches a lower end frame member from above is defined as a fully-open position,
   a position located downward from the fully-open position is defined as a downward movement limit position,
   the opening-closing member is in a fully-open state at the fully-open position and is further downwardly movable to the downward movement limit position while maintaining the fully-open state,
   an area between the fully-open position and the downward movement limit position is defined as a fully-open movable area, and
   the threshold value is not set if the position where the opening-closing member was located when the motor was stopped is in the fully-open movable area.

8. An opening-closing drive device that drives an upwardly and downwardly movable opening-closing member, the opening-closing drive device comprising:
   a motor;
   a position detection sensor configured to detect a position of the opening-closing member when the motor is stopped and in a non-driven state and when the opening-closing member has inadvertently moved downward; and
   a controller configured to drive the motor in order to upwardly move the opening-closing member when determining that the opening-closing member has inadvertently moved downward to a position distanced by a predetermined threshold or greater based on a signal from the position detection sensor when the motor is in the non-driven state and the opening-closing member has inadvertently moved downward to the position distanced by the predetermined threshold or greater.

9. The opening-closing drive device according to claim 8, wherein the controller is configured to set the threshold value in accordance with a position where the opening-closing member was located when the motor was stopped.

10. The opening-closing drive device according to claim 9, wherein
  the threshold value is set to a first downward movement amount if the position where the opening-closing member was located when the motor was stopped is in a closure proximity area, and
  the threshold value is set to a second downward movement amount that is greater than the first downward movement amount if the position where the opening-closing member was located when the motor was stopped is in an open-closed intermediate area that is located downward from the closure proximity area.

11. The opening-closing drive device according to claim 9, wherein
  the threshold value is set to a first downward movement amount if the position where the opening-closing member was located when the motor was stopped is in a fully-open proximity area, and
  the threshold value is set to a second downward movement amount that is greater than the first downward movement amount if the position where the opening-closing member was located when the motor was stopped is in an open-closed intermediate area that is located upward from the fully-open proximity area.

12. The opening-closing drive device according to claim 9, wherein
  a position where the opening-closing member reaches an upper end frame member from below is defined as a close position,
  a position located upward from the close position is defined as an upward movement limit position,
  the opening-closing member is in a fully-closed state at the close position and is further upwardly movable to the upward movement limit position while maintaining the fully-closed state,
  an area between the close position and the upward movement limit position is defined as a closure movable area, and
  the threshold value is set to a downward movement amount that is greater than zero and less than or equal to a distance between the position where the window glass was located when the motor was stopped and the close position if the position where the opening-closing member was located when the motor was stopped is in the closure movable area.

13. The opening-closing drive device according to claim 12, wherein
  the threshold value is set separately for multiple stages if the position where the opening-closing member was located when the motor was stopped is in the closure movable area, and
  as the position where the opening-closing member was located when the motor was stopped becomes closer to the upward movement limit position, the threshold value is set to a larger downward movement amount.

14. The opening-closing drive device according to claim 9, wherein
  a position where the opening-closing member reaches a lower end frame member from above is defined as a fully-open position,
  a position located downward from the fully-open position is defined as a downward movement limit position,
  the opening-closing member is in a fully-open state at the fully-open position and is further downwardly movable to the downward movement limit position while maintaining the fully-open state,
  an area between the fully-open position and the downward movement limit position is defined as a fully-open movable area, and
  the threshold value is not set if the position where the opening-closing member was located when the motor was stopped is in the fully-open movable area.

15. An opening-closing drive device that drives an upwardly and downwardly movable opening-closing member, the opening-closing drive device comprising:
  a motor;
  a position detection sensor configured to detect a position of the opening-closing member when the motor is stopped and in a non-driven state and when the opening-closing member has inadvertently moved downward; and
  a controller that controls driving of the motor, wherein
  the controller is configured to determine a downward movement amount of the opening-closing member based on a signal from the position detection sensor or determine a position of the opening-closing member after being downwardly moved based on a signal from the position detection sensor, and
  the controller is configured to drive the motor in order to upwardly move the opening-closing member when the motor is in the non-driven state and when the downward movement amount is inadvertently beyond a predetermined threshold value or when the position of the opening-closing member after being downwardly moved is inadvertently beyond a certain position.

* * * * *